United States Patent [19]

Rosenberg

[11] Patent Number: 4,592,839
[45] Date of Patent: Jun. 3, 1986

[54] MULTIPLE-DISC FILTER

[76] Inventor: Peretz Rosenberg, Moshav Beit Shearim, Israel

[21] Appl. No.: 613,351

[22] Filed: May 23, 1984

[30] Foreign Application Priority Data

Jun. 9, 1983 [IL] Israel .................................... 68935
Sep. 7, 1983 [IL] Israel .................................... 69679

[51] Int. Cl.$^4$ .................... B01D 29/38; B01D 29/46
[52] U.S. Cl. .................................... 210/352; 210/411; 210/446; 210/488; 210/498
[58] Field of Search .............. 210/345, 350, 352, 357, 210/409, 411, 412, 446, 447, 448, 453, 488, 498

[56] References Cited

U.S. PATENT DOCUMENTS

| 515,769 | 3/1894 | Harris | 210/411 X |
|---|---|---|---|
| 1,643,299 | 9/1927 | Furness | 210/488 |
| 1,758,284 | 5/1930 | Gronning | 210/488 X |
| 2,583,423 | 1/1952 | Hallinan | 210/488 X |
| 2,847,126 | 8/1958 | Goodman | 210/411 |
| 3,152,988 | 10/1964 | Gutkowski et al. | 210/498 X |
| 3,207,311 | 9/1965 | Kasten | 210/488 X |
| 3,209,915 | 10/1965 | Gutkowski | 210/498 X |
| 3,369,665 | 2/1968 | Paulson | 210/448 X |
| 3,397,794 | 8/1968 | Toth et al. | 210/498 X |
| 3,622,003 | 11/1971 | Czech et al. | 210/488 X |
| 4,123,356 | 10/1978 | Suqimoto et al. | 210/427 X |
| 4,402,829 | 9/1983 | Cordua | 210/411 X |
| 4,422,938 | 12/1983 | Miller | 210/411 |
| 4,430,232 | 2/1984 | Doucet | 210/488 X |

FOREIGN PATENT DOCUMENTS

| 969125 | 12/1950 | France | 210/488 |
|---|---|---|---|
| 1096739 | 12/1967 | United Kingdom | 210/488 |

Primary Examiner—Robert Spitzer
Attorney, Agent, or Firm—Benjamin J. Barish

[57] ABSTRACT

A multiple-disc filter includes a pressure member located within the filter housing upstream of the discs forming the stack to press the discs tighter together when the fluid flows from the housing inlet to the housing outlet, and to permit the discs to move apart for cleaning the filter when the fluid flows in the reverse direction. Each filter disc is formed with alternating groups of radially-extending slots to define circumferential filtering passageways between the ends of the slots.

7 Claims, 9 Drawing Figures

U.S. Patent  Jun. 3, 1986  4,592,839
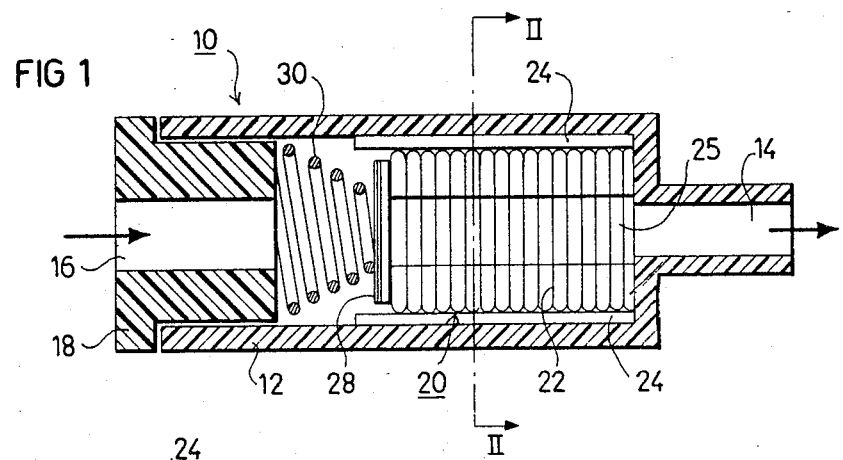
FIG 1
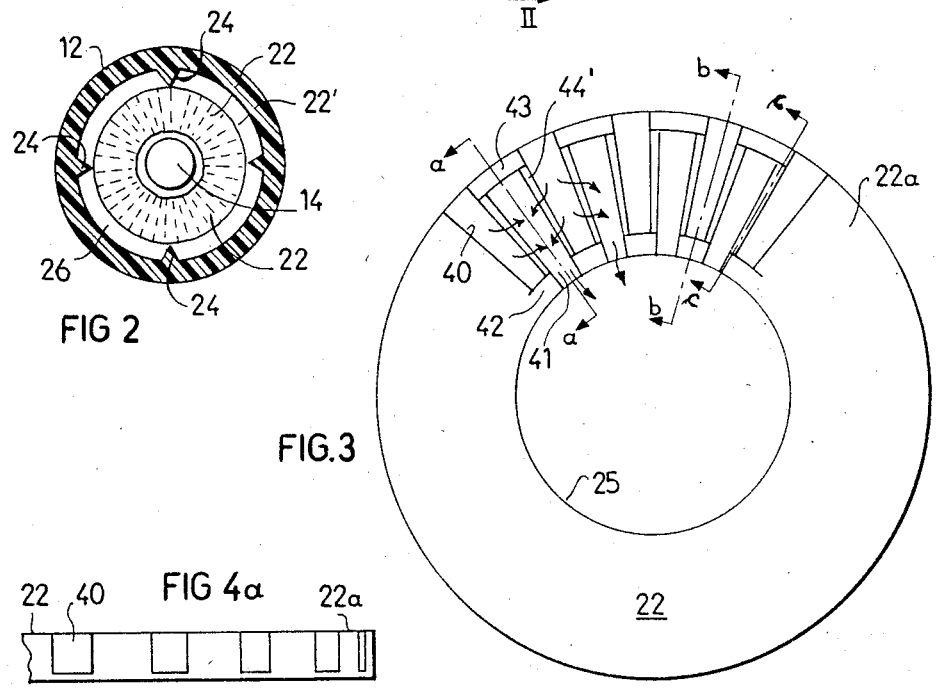
FIG 2
FIG. 3
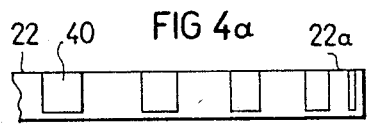
FIG 4a
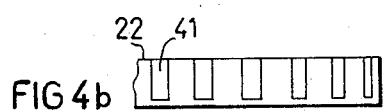
FIG 4b
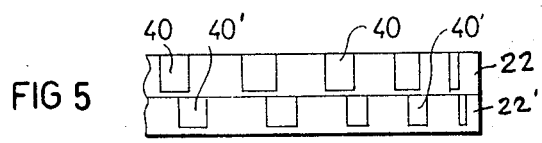
FIG 5
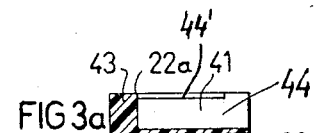
FIG 3a
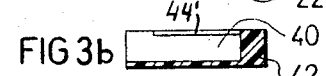
FIG 3b
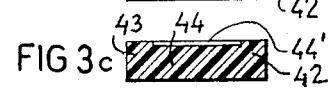
FIG 3c

MULTIPLE-DISC FILTER

RELATED APPLICATION

The present application is related to continuation-in-part application Ser. No. 779,996 filed Sept. 25, 1985, which discloses subject matter common to that of the present application and new subject matter.

BACKGROUND OF THE INVENTION

The present invention relates to a multiple-disc filter, and also to a disc construction for use in such filters.

Multiple-disc filters are gaining increased use particularly in water irrigation systems for removing foreign particles which may clog the water irrigation devices. Such filters include a stack of filter discs formed with ribbed side faces, such as to form narrow filtering channels between the discs when arranged in a stack. While some of the dirt particles removed from the water may be retained within the stack between the filter discs, as a rule, most or substantially all of the dirt particles are removed and retained at the upstream face of the filter stack, namely that facing the filter inlet. In most cases, this is the outer face of the filter stack, but in some cases could also be the inner face, i.e. that defined by the apertures in the filter discs, in an arrangement wherein the water passes radially outwardly of the stack.

An object of the present invention is to provide a filter which may be cleaned in a quick and simple manner with dissembling it. Another object of the present invention is to provide a multiple-disc fluid filter having an increased dirt-removing and dirt-holding capacity over the conventional filters of this type. A further object of the invention is to provide a filter disc construction particularly useful in filters of this type.

SUMMARY OF THE INVENTION

According to one aspect of the present invention, there is provided a filter including a housing having an inlet and an outlet; a stack of filter elements within the housing for filtering the fluid flowing therethrough; and a pressure member located within the housing in the path of the inletted fluid upstream of the filter elements such as to be impinged by the fluid introduced into the housing via the inlet, to constrain the fluid to flow to the upstream surface of the stack of filter elements and then therethrough to the housing outlet, and to press the filter elements together by the force of the inletted fluid to tighten the stack when the fluid flows in the forward direction from the housing inlet to the housing outlet. The filter further includes a spring acting against the pressure member such that when the fluid is introduced into the housing via the inlet, the force of the spring adds to the force of the fluid to cause the pressure member to constrain the fluid to flow in the forward direction to the upstream surface of the stack and to press the filter elements together to tighten the stack for a normal filtering operation, during which solid particles separate from the fluid and accumulate on the upstream surface of the stack and between the filter elements of the stack. However, when the fluid is introduced into the housing via the outlet to the downstream surface of the stack to flow in the reverse direction through the stack, the force of the fluid causes the pressure member to move against the force of the spring to loosen the stack and thereby to permit the fluid to flush out the solid particles accumulated between the filter elements of the stack and on the upstream surface of the stack.

It will thus be seen that such a construction enables the filter to be cleaned in a simple manner by merely reversing the fluid flow so that the fluid is introduced into the housing outlet rather than into the housing inlet.

According to another aspect of the invention, there is provided a multiple-disc filter including a housing having an inlet and an outlet and a plurality of filtering discs arranged in a stack for filtering the fluid flowing between the discs from the inlet to the outlet. One face of each disc is integrally formed with a plurality of parallel, spaced ribs projecting therefrom, with one end of each rib being joined by a bridge to the next adjacent rib at one side thereof, and the opposite end of each rib being joined by a second bridge to the next adjacent rib at the opposite side thereof. Each of the ribs is formed with a flat outer face bordered on its opposite sides by line edges. The stack of discs further includes spacing means between adjacent discs to space the outer surface of the ribs of one disc from the opposite face of the next adjacent disc, such that the confronting faces of adjacent discs define a first group of recesses between the ribs communicating with the inlet, a second group of recesses alternating with the first group of recesses and communicating with the outlet, and a plurality of filtering passageways between the outer faces of the ribs and the opposite face of the next adjacent disc. Each of these filtering passageways is defined by the line edge of a rib bordering its first group of recesses in one disc and the spaced face of the next adjacent disc, such that each filtering passageway is of elongated configuration extending continuously for the complete length of its respective rib, whereby solid particles in the fluid are blocked by the line edges of the ribs and accumulate in the first group of recesses.

It will thus be seen that the fluid (e.g. water) to be filtered is constrained to pass between each pair of discs, first in the radial direction through the first-mentioned group of recesses, then in the circumferential direction through the filtering passageways, and finally again through the radial direction through the other group of recesses. Since the filtering passageways are continuous, linear passageways, each defined by a line edge (of the ribs) and a spaced surface (that of the next adjacent disc), rather than by two grooved surfaces as in the conventional filter disc construction, the solid particles will either pass or not pass the line edge. Such a construction therefore substantially decreases the sensitivity of the filter from becoming clogged by dirt particles, substantially increases the dirt-holding capacity of the filter and thereby the period of time during which the filter may be used before cleaning is required, and substantially facilitates cleaning the filter, which may be done merely by reverse-flushing.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a longitudinal sectional view illustrating one form of filter constructed in accordance with the present invention;

FIG. 2 is a transverse sectional view along lines II—II of FIG. 1;

FIG. 3 is an enlarged side-elevational view illustrating the construction of one of the filter discs in the filter of FIGS. 1 and 2;

FIGS. 3a, 3b, and 3c are sectional views along lines a—a, b—b, and c—c, respectively, of FIG. 3;

FIGS. 4a and 4b are fragmentary, end-elevational views illustrating the outer and inner ends, respectively, of the filter disc illustrated in FIG. 3; and FIG. 5 is a fragmentary end-elevational view illustrating two of the discs in the stack.

DESCRIPTION OF A PREFERRED EMBODIMENT

The filter illustrated in FIGS. 1 and 2 is particularly useful for filtering dirt particles in a water irrigation system. The filter comprises a housing, generally designated 10, constituted of a main cylindrical section 12 terminating at one end in an end wall 13 formed with the filter outlet 14. The opposite end of cylindrical section 12 is closed by a cap 18 formed with a central aperture 16 serving as the filter inlet.

The filter body, generally designated 20, is disposed within the filter housing 10 and is constituted of a plurality of discs 22 arranged in a stack and spaced from the inner face of the housing cylindrical section 12 by a plurality of axially-extending, circumferentially-spaced ribs 24 formed on the inner face of the housing section. In the construction illustrated in FIGS. 1 and 2, the outer surface of the stack of discs constitutes the upstream surface facing the inlet 16, and the inner surface of the stack constitutes its downstream surface facing the outlet 14. Each of the filter discs 22 is formed with a central opening 25 communicating with the housing outlet 14, and thereby defining the downstream side of the filter stack. A solid, non-apertured disc 28 is applied to the end of the filter stack 20 facing inlet 16, which disc 28 blocks the passageway through openings 25.

It will thus be seen that disc 28 is located within the housing in the path of the inletted fluid upstream of the filter discs 22, such that when the water (or other fluid) is inletted via the inlet 16, it causes disc 28, which acts as a pressure member, to press the filter discs 22 together to tighten the stack. At the same time, disc 28 constrains the water inletted from inlet 16 to flow to the outer face of the stack of discs 22, i.e., in the annular space between ribs 24, and then radially inwardly between the discs of the stacks to the outlet 14.

Pressure disc 28 and the filter discs 22 are urged in the illustrated stacked arrangement by a spring 30 interposed between cap 18 and disc 28 during the normal operation of the filter. Thus, during the normal operation of the filter, spring 30 acts with the pressure disc 28 to press the filter discs 22 together to tighten the stack when the water flows from the housing inlet 16 to the housing outlet 14 during the normal filtering operation of the filter.

The illustrated filter is cleaned by reverse flushing. Thus, when the water supply is connected to the outlet 14 (rather than to the inlet 16), the water is applied to pressure disc 28 since that disc closes the passageway through opening 25. Pressure disc 28 is thus moved against the force of spring 30, which thereby permits the filter discs 22 to move apart to loosen the stack, and to permit the water to pass in the reverse direction between the side faces of the filter discs 22. The water thus flows in the reverse direction from the outlet 14 and through openings 25, causing pressure disc 28 to loosen the stack, then in the radial direction between the filter discs 22 of the stack, and finally out through the filter inlet 16, this reverse flow of the water thereby flushing out the dirt particles previously accumulated between the filter discs 22 and also in the upstream (outer) face of the disc stack.

The construction of each of the filter discs 22 is illustrated in FIG. 3 and the sectional views of FIGS. 3a, 3b, and 3c.

Thus, each filter disc 22 is integrally formed on one face 22a (e.g., FIG. 3) with a plurality of parallel, spaced ribs 44 projecting from face 22a, while the opposite face 22b (e.g., FIG. 3a) of the disc is flat. Each rib 44 is joined to the next adjacent rib at one side by a bridge 42 integral with the rib at its inner end, and to the next rib at the opposite side by another bridge 43 integral with the rib at its outer end. Both bridges 42 and 43 are slightly deeper than ribs 44 and thereby constitute ridges which project to a greater height than the ribs from face 22a of each disc, such that the ribbed face 22a of each disc and the flat face 22b of the next adjacent disc in the stack define a first group of recesses 40 between the ribs communicating with the housing inlet 16, a second group of recesses 41 between the ribs communicating with the housing outlet 14, and a plurality of filtering passageways 44' (e.g., FIGS. 3, 3c) between the flat faces of ribs 44 in one disc and the flat face 22b of the next adjacent disc. The latter filtering passageways establish communication between recesses 40 and 41 for the complete length of ribs 44.

Each of the ribs 44 has a flat outer face bordered on its opposite sides by line edges. Thus, the filtering passageways 44' are defined by the spaces between the line edges of the ribs bordering recesses 40 in one disc, and the flat face 22b of the next adjacent disc, such that the filtering passageways are of elongated linear configuration and extend continuously for the complete length of the respective ribs. The solid particles in the water of greater dimension than the filtering passageways 44' are thus blocked by the line edges of the ribs and accumulate in recesses 40.

The illustrated filter operates as follows:

The water entering the upstream recesses 40 is constrained to flow first in the radial direction through recesses 40, then in the circumferential direction through both of the filtering passageways 44' on opposite sides of each recess 40 to the downstream recesses 41, and then in the radial direction through the latter recesses and out through the outlet 14. The line edges of the ribs 44 bordering the upstream recesses 40, being slightly spaced from the flat face 22b of the next adjacent disc 22 by the projection of ridges 42, 43 past the outer faces of the ribs 44, define the filtering passageways 44' which block any solid particles of a size larger than these passageways and cause the solid particles to accumulate in the upstream recesses 40.

Since each filtering passageway 44' is thus a continuous linear passageway defined by a line edge (the line edge of ribs 44) and a surface (the flat surface 22b of the next adjacent disc), there is less likelihood of solid particles becoming wedged in this filtering passageway, and if particles do become so wedged, there is less likelihood that they will clog the filter, as compared, for example, to the conventional filter disc construction wherein the filtering passageways are small individual passageways defined by two grooved surfaces. Moreover, the width of each rib 44 (defining the width of each filtering passageway 44') is a small fraction of the length of the rib, and is also a small fraction of the width of the recesses 40, 41, so that the illustrated construction provides substantially higher filtering capacity and substantially higher dirt-holding capability than the conventional grooved-disc filters. Further, since the separated solid particles are accumulated in the upstream recesses 40 of large dimension they can be effectively removed merely by reverse-flushing without disassembling the filter.

During the normal filtering operation, the pressurized water applied to the housing inlet acts with spring 30 against pressure disc 28 to press together and tighten the stack of discs 22, and thereby to force the water to flow through the filtering passageways 44', wherein the solid particles are separated and accumulate in the upstream recesses 40, as described above.

To clean the filter by reverse-flushing, the water supply is connected to the housing outlet 14, rather than the housing inlet 16. The pressure of the water is then applied to pressure disc 28 against the force of spring 30 to loosen the stack and to permit the solid particles accumulated within recesses 40, as well as any solid particles wedged between the discs, to be flushed out through inlet 16.

It will also be appreciated that the difference in thickness between bridges 42, 43 and ribs 44 determines the size of the filtering passageways 44', and thereby the size of the particles to be removed from the fluid. Thus, these passageways 44' may be made of very shallow depth to produce a fine filtering action, or may be made of greater depth to produce a coarser filtering action.

Preferably, the filter discs 22 are stacked with their recesses 40 and 41 in non-aligned relationship in adjacent discs of the stack. This is shown by the two discs illustrated in FIG. 5, wherein recesses 40 of disc 22 are non-aligned with respect to recesses 40' of the next adjacent disc 22'. This arrangement is preferred so as to more uniformly distribute the fluid around the outer circumference of the disc stack as it passes therethrough to the filter outlet 14.

It will also be appreciated that the flow through the filter stack could be in a radial outward direction. In a conventional filter, such a radial outward flow of the fluid would cause the dirt to build up at the inner edges, thereby decreasing the filtering capacity of the filter. In the present invention, however, this drawback would not apply since the dirt particles are removed by the filtering passageways 44', which are of the same length irrespective of the direction of passage of the fluid through the filter stack.

It will thus be seen that the filter illustrated in the drawings is characterized by a capacity to hold large quantities of separated solid particles before cleaning is required, a low sensitivity to clogging by the solid particles in the fluid being filtered, and a capability of being conveniently cleaned by merely connecting the fluid to the filter outlet 14, whereupon the fluid will flush out through the filter inlet 16 the bulk of the solid particles accumulated within the upstream recesses 40 and any further solid particles wedged between the filter discs.

While the invention has been described with respect to one preferred embodiment, it will be appreciated that many other variations, modifications, and applications of the invention may be made.

What is claimed is:

1. A filter including:
   a housing having an inlet and an outlet;
   a stack of filter elements within said housing for filtering the fluid flowing therethrough from the housing inlet to the housing outlet;
   said stack of filter elements having an upstream surface facing the housing inlet and a downstream surface facing the housing outlet;
   a pressure member located within the housing in the path of the inletted fluid upstream of the filter elements such as to be impinged by the fluid introduced into the housing via its inlet, to constrain the fluid to flow to the upstream surface of the stack of filter elements and therethrough to the housing outlet, and to press the filter elements together by the force of the inletted fluid to tighten the stack when the fluid flows from the housing inlet to the housing outlet;
   and a spring acting against said pressure member such that:
   (a) when the fluid is introduced into the housing in a forward direction via said inlet, the force of the spring adds to the force of the fluid to cause the pressure member to constrain the fluid to flow in the forward direction to the upstream surface of the stack and to press the filter elements together to tighten the stack, for a normal filtering operation during which solid particles are separated from the fluid and accumulate on the upstream surface of the stack and between the filter elements of the stack;
   (b) and when the fluid is introduced into the housing via said outlet so as to flow in the reverse direction first to the downstream surface of the stack and then through the stack, the force of the fluid causes the pressure member to move against the force of the spring to loosen the stack and thereby to permit the fluid to flush out the solid particles accumulated between the filter elements of the stack and on the upstream surface of the stack.

2. The filter according to claim 1, wherein said pressure member is a non-apertured disc located within the housing in the path of the inletted fluid and upstream of the filter discs.

3. The filter according to claim 1, wherein said filter elements are discs having ribbed side faces.

4. A filter according to claim 3, wherein said discs are of annular configuration such that the inner edges of the discs in the stack define a tubular passageway leading to the housing outlet, said pressure member covering the side of said tubular passageway facing the housing inlet and deflecting the inletted fluid to the outer faces of the stack of discs.

5. The filter according to claim 3, wherein the inner face of the housing is formed with axially-extending, circumferentially-spaced ribs engageable with the outer faces of the discs for spacing them from the inner face of the housing.

6. The filter according to claim 3, wherein said housing is of tubular shape and is formed with said inlet at one end and with said outlet at the opposite end.

7. The filter according to claim 3, wherein said housing includes a main section having an end wall formed with said housing outlet, and a cap formed with said housing inlet, said spring being interposed between said cap and said pressure member and urging said pressure member against the inlet disc of the stack, and the outlet disc of the stack against said end wall of the main housing.

* * * * *